US010784489B2

(12) United States Patent
Kim et al.

(10) Patent No.: US 10,784,489 B2
(45) Date of Patent: Sep. 22, 2020

(54) ELECTRODE ASSEMBLY

(71) Applicant: LG Chem, Ltd., Seoul (KR)

(72) Inventors: Kyung Min Kim, Daejeon (KR); Joo Hwan Sung, Daejeon (KR)

(73) Assignee: LG Chem, Ltd. (KR)

(*) Notice: Subject to any disclaimer, the term of this patent is extended or adjusted under 35 U.S.C. 154(b) by 203 days.

(21) Appl. No.: 15/668,795

(22) Filed: Aug. 4, 2017

(65) Prior Publication Data

US 2018/0047969 A1 Feb. 15, 2018

(30) Foreign Application Priority Data

Aug. 9, 2016 (KR) .................. 10-2016-0101079

(51) Int. Cl.
*H01M 2/22* (2006.01)
*H01M 10/04* (2006.01)
*H01M 2/26* (2006.01)
*H01M 10/0585* (2010.01)

(52) U.S. Cl.
CPC ............... *H01M 2/22* (2013.01); *H01M 2/26* (2013.01); *H01M 10/04* (2013.01); *H01M 10/0585* (2013.01)

(58) Field of Classification Search
CPC .............................. H01M 2/22; H01M 10/04
See application file for complete search history.

(56) References Cited

U.S. PATENT DOCUMENTS

| 5,415,954 | A | * | 5/1995 | Gauthier | ............. | H01M 2/22 |
| | | | | | | 429/161 |
| 2013/0244116 | A1 | * | 9/2013 | Watanabe | ............. | H01M 4/133 |
| | | | | | | 429/231.8 |
| 2014/0255778 | A1 | | 9/2014 | Huh et al. | | |
| 2016/0329547 | A1 | | 11/2016 | Jin et al. | | |

FOREIGN PATENT DOCUMENTS

| KR | 20140112609 A | 9/2014 |
| KR | 20160045033 A | 4/2016 |

* cited by examiner

*Primary Examiner* — Ula C Ruddock
*Assistant Examiner* — Frank A Chernow
(74) *Attorney, Agent, or Firm* — Lerner, David, Littenberg, Krumholz & Mentlik, LLP

(57) ABSTRACT

Provided is an electrode assembly. According to the present invention, a separator or an electrode may be prevented from being damaged by an electrode tab when an external impact is applied to a secondary battery or the electrode assembly to prevent short circuit from occurring in the secondary battery. To achieve the above object, the electrode assembly according to the present invention may include at least one electrode tab, and the electrode tab may include a conductive part and a non-conductive part (or a ductile part).

14 Claims, 5 Drawing Sheets

ELECTRODE ASSEMBLY

CROSS-REFERENCE TO RELATED APPLICATIONS

The present application claims the benefit of the priority of Korean Patent Application No. 10-2016-0101079, filed on Aug. 9, 2016, which is hereby incorporated by reference in its entirety.

BACKGROUND OF THE INVENTION

Field of the Invention

The present invention relates to an electrode assembly, and more particularly, to an electrode assembly having more improved stability against an external impact.

Description of the Related Art

An electrode assembly formed by alternately stacking an electrode and a separator is mounted in a secondary battery. An electronic device has to be electrically connected to the secondary battery in order to receive energy from the secondary battery. For this, an electrode lead electrically connected to the electronic device may be provided in the secondary battery, and an electrode tab electrically connected to the electrode lead may be provided on the electrode assembly. In general, the electrode tab is made of an electrical conductive material in order to be electrically connected to the electrode lead.

FIG. 1 is a perspective view illustrating configurations of an electrode tab before and after an impact is applied to the electrode tab according to a related art.

As illustrated in FIG. 1, the electrode tab according to the related art is made of an electrical conductive material.

However, a secondary battery in which an electrode assembly including the electrode tab is mounted may be subjected to an external impact according to use environments. A portion of constituents of the electrode assembly may be damaged by the impact to cause short circuit. The short circuit may cause ignition or explosion of the secondary battery.

One of the causes of occurrence of the short circuit is that the electrode tab is folded to damage a separator or an electrode of the electrode assembly. That is, as illustrated in FIG. 1, when an impact is applied to the electrode tab from the outside, the electrode tab may be folded. Thus, a deformed portion of the electrode tab due to the folded electrode tab may damage the separator or the electrode to cause the short circuit of the secondary battery.

SUMMARY OF THE INVENTION

An aspect of the present invention provides an electrode assembly which prevents a secondary battery from being short-circuited due to damage of a separator or an electrode of the electrode assembly by an electrode tab when an external impact is applied to the secondary battery or the electrode assembly.

According to an aspect of the present invention, there is provided an electrode assembly manufactured by alternately stacking an electrode and a separator, the electrode assembly including: at least one electrode tab, wherein the electrode tab includes: a conductive part; and a non-conductive part.

The non-conductive part may be disposed on an upper side or a lower side of the conductive part.

The non-conductive part may be disposed on left and right sides of the conductive part.

The electrode tab may have a plate shape, and the conductive part may be surrounded by the non-conductive part, wherein the conductive part may be exposed with respect to a main plane of the electrode tab, which has a large surface area, of outer surfaces of the electrode tab.

The non-conductive part may include a polymer material.

The electrode tab may be a positive electrode tab.

The conductive part may include aluminum.

According to another aspect of the present invention, there is provided an electrode assembly manufactured by alternately stacking an electrode and a separator, the electrode assembly including: at least one electrode tab, wherein the electrode tab includes: a conductive part; and a ductile part, wherein the ductile part has ductility greater than that of the conductive part.

The ductile part may be disposed on an upper side or a lower side of the conductive part.

The ductile part may be disposed on left and right sides of the conductive part.

The electrode tab may have a plate shape, and the conductive part may be surrounded by the ductile part, wherein the conductive part may be exposed with respect to a main plane of the electrode tab, which has a large surface area, of outer surfaces of the electrode tab.

The ductile part may include a polymer material.

The electrode tab may be a positive electrode tab.

The conductive part may include aluminum.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, a structure of an electrode assembly according to an embodiment and another embodiment will be described with reference to the accompanying drawings.

Structure of Electrode Assembly

Figure 1:
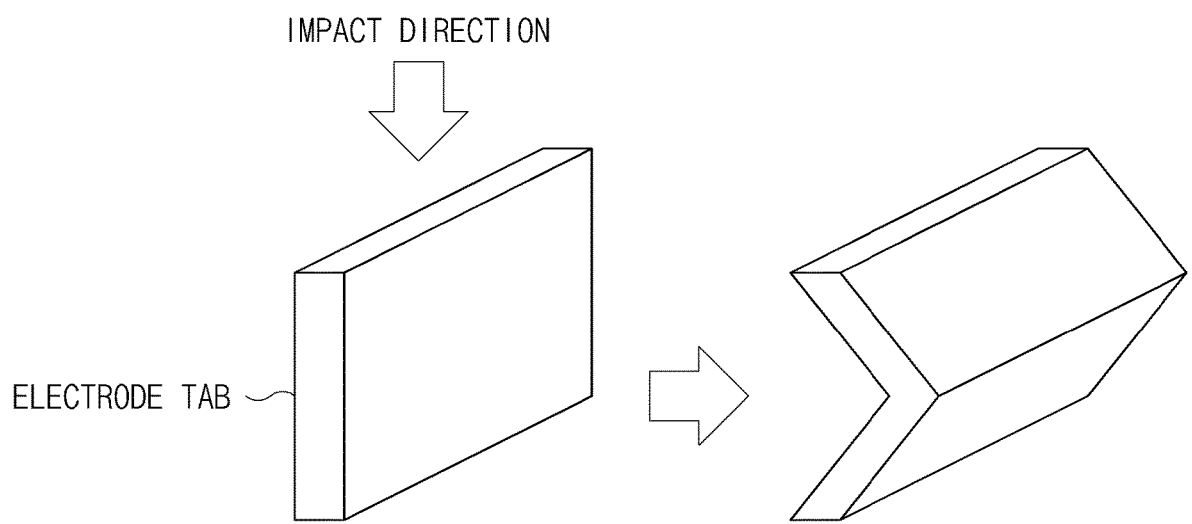
FIG. 1 is a perspective view illustrating configurations of an electrode tab before and after an impact is applied to the electrode tab according to a related art.
Figure 2:
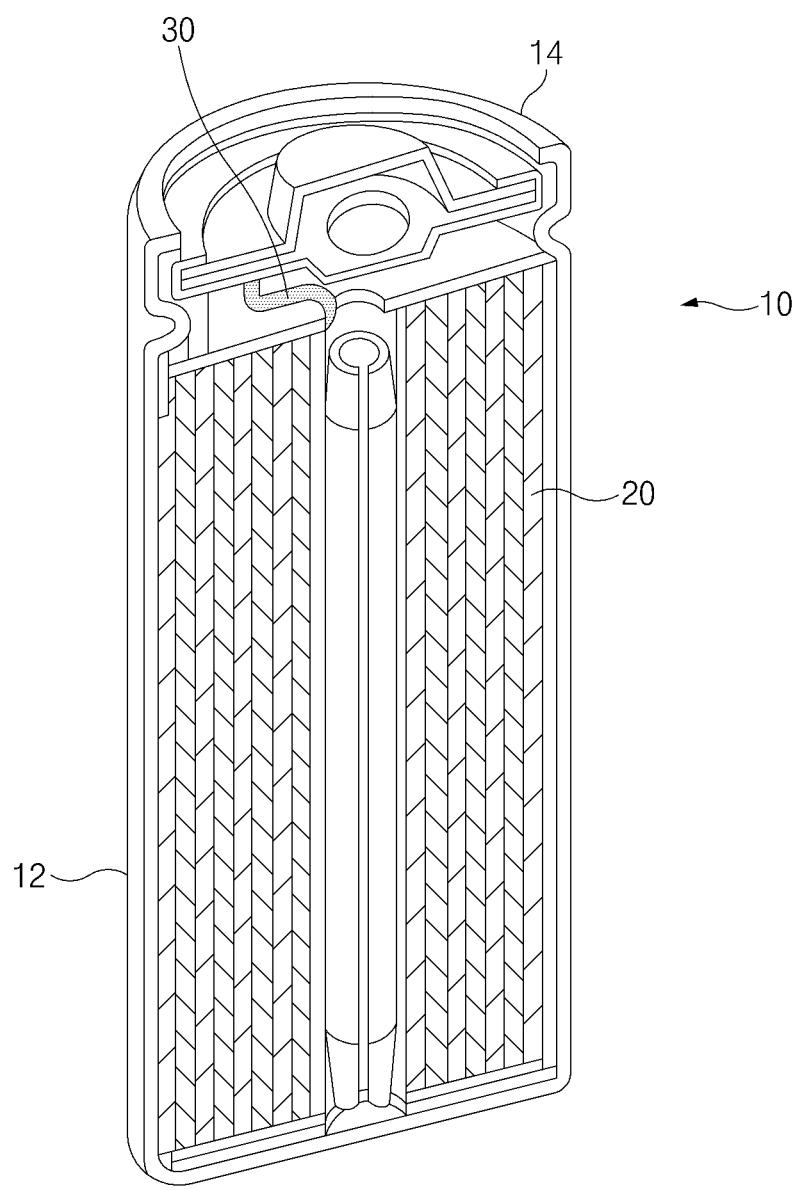
FIG. 2 is a perspective view illustrating a structure of a secondary battery in which an electrode assembly including an electrode tab is mounted according to an embodiment of the present invention.

FIG. 2 is a perspective view illustrating a structure of a secondary battery in which an electrode assembly including an electrode tab is mounted according to an embodiment of the present invention.

As illustrated in FIG. 2, a secondary battery 10 may include a battery can 12 constituting a body of the secondary battery 10 and a top cap assembly 14 provided on an upper portion of the battery can 12 to seal an upper opening of the battery can 12.

An empty space may be defined in the battery can 12, and the electrode assembly 20 may be mounted in the empty space of the battery can 12. The electrode assembly according to an embodiment of the present invention may be a jelly-roll type electrode assembly 20 in which an electrode and a separator are disposed and then wound.

An electronic device has to be electrically connected to the secondary battery 10 in order to receive energy from the secondary battery 10. For this, an electrode lead (not shown) electrically connected to the electronic device may be provided in the secondary battery 10, and an electrode tab 30 electrically connected to the electrode lead may be provided on the electrode assembly 20. Here, the electrode tab 30 may be provided at an upper central portion of the electrode assembly 20. The electrode tab 30 provided on the electrode assembly 20 may be a positive electrode tab and a negative electrode tab. As illustrated in FIG. 2, the electrode tab provided at the upper central portion of the electrode assembly 20 may be a positive electrode tab.

The secondary battery in which the electrode assembly including the electrode tab is mounted may be subjected to an external impact according to use environments. Thus, a portion of constituents of the electrode assembly may be damaged by the external impact to cause short circuit. The short circuit may cause ignition or explosion of the secondary battery.

One of the causes of occurrence of the short circuit is that the electrode tab is folded to damage the separator or the electrode of the electrode assembly. That is, when an impact is applied to the electrode tab from the outside, the electrode tab may be folded. Thus, a deformed portion of the electrode tab due to the folded electrode tab may damage the separator or the electrode to cause the short circuit of the secondary battery. Particularly, this phenomenon may easily occur when an impact is applied to the electrode tab, which is disposed on the upper portion of the electrode assembly, downward from the outside. Also, when an impact is applied to the electrode tab from the outside, the separator or the electrode of the electrode assembly may be damaged by a portion of the electrode tab, which is adjacent to the electrode assembly, to cause the short circuit.

Figure 3:
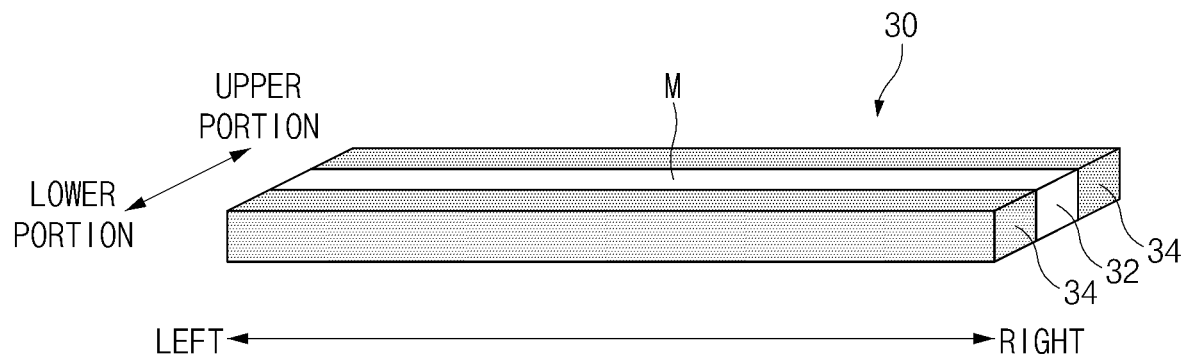
FIG. 3 is a perspective view illustrating the electrode tab of the electrode assembly according to an embodiment of the present invention.

The present invention is an invention for solving the above-described limitations. FIG. 3 is a perspective view illustrating the electrode tab of the electrode assembly according to an embodiment of the present invention.

As illustrated in FIG. 3, the electrode tab 30 of the electrode assembly according to an embodiment of the present invention may include a conductive part 32 and a non-conductive part 34. Alternatively, the electrode tab according to an embodiment of the present invention may include a conductive part 32 and a ductile part 34. Here, the term "ductile part" used in this specification may means a constituent manufactured by using a material having ductility greater than that of the conductive part of the electrode tab.

The ductility may means a degree to which plastic deformation occurs when tensile force is applied to a material and be used as a measure of the properties of a material. Particularly, a material having high ductility is often used as a measure of the degree of softness of a material because it is not broken when tensile force acts, but is large in degree of the plastic deformation. That is, a material having high ductility may be generally a soft material.

According to an embodiment of the present invention, the non-conductive part may be provided in the electrode tab to prevent the separator or the electrode of the electrode assembly from being damaged by deformation such as folding of the electrode tab due to an external impact and also prevent current from flowing through the electrode tab even though the electrode tab comes into contact with the damaged separator or electrode and thereby to prevent the short circuit from occurring. Also, according to an embodiment of the present invention, the ductile part may be provided in the electrode tab to prevent the separator or the electrode from being damaged by the electrode tab even though the electrode tab is deformed, i.e., folded by an external impact, thereby preventing the short circuit from occurring.

Here, according to an embodiment of the present invention, the non-conductive part or the ductile part 34 may be provided on an upper or lower portion of the conductive part 32 as illustrated in FIG. 3. For example, the non-conductive part or the ductile part 34 may be provided on the upper and lower portions. The non-conductive part or the ductile part 34 may be provided on the upper side of the conductive part 32 to prevent the separator or the electrode of the electrode assembly from being damaged by the electrode tab even though the electrode tab is deformed, i.e., folded by an external impact and also prevent current from flowing through the electrode tab even through the separator or the electrode of the electrode assembly is damaged.

Figure 4:
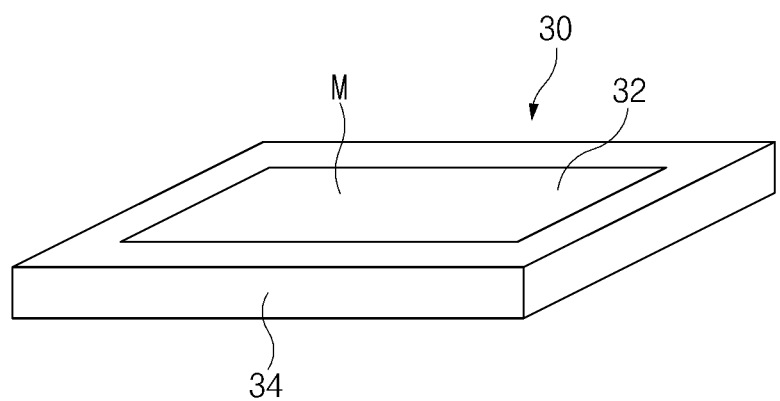
FIG. 4 is a perspective view illustrating an electrode tab of an electrode assembly according to another embodiment of the present invention.

FIG. 4 is a perspective view illustrating an electrode tab of an electrode assembly according to another embodiment of the present invention. As illustrated in FIG. 4, in an electrode tab 30 of an electrode assembly according to another embodiment of the present invention, a non-conductive part or a ductile part 34 may be provided at left and right sides of a conductive part 32. When the non-conductive part or the ductile part is provided at the left and right sides of the conductive part, it may prevent a separator or an electrode of the electrode assembly from being damaged due to the left and right side of the electrode tab or prevent short circuit from occurring due to the left and right sides of the electrode tab event through an impact is applied to the electrode tab from the outside. The non-conductive part or the ductile part 34 may be provided on upper and lower sides and left and right sides of the conductive part 32. In this case, the conductive part 32 may be surrounded by the non-conductive part or the ductile part 34, and also, at least one surface of the conductive part 32 may be exposed to the outside.

Also, the electrode tab 30 may have a plate shape. Here, when a surface, which has a large surface area, of outer surfaces of the electrode tab 30 is defined as a main plane M, the conductive part 32 may be surrounded by the conductive part or the ductile part 34, and also, the conductive part 32 may be formed to be exposed to the outside with respect to the main plane M of the electrode tab 30. For example, as illustrated in FIG. 4, the conductive part 32 may be formed to be exposed to the outside with respect to all of the main planes M opposite to each other. At least one surface of the surfaces of the conductive part 32, which is exposed to the outside, may be configured to electrically connect the electrode tab 30 to an electrode lead (not shown).

Also, the non-conductive part may include a polymer material, and the conductive part may include aluminum or be aluminum.

Figure 5:
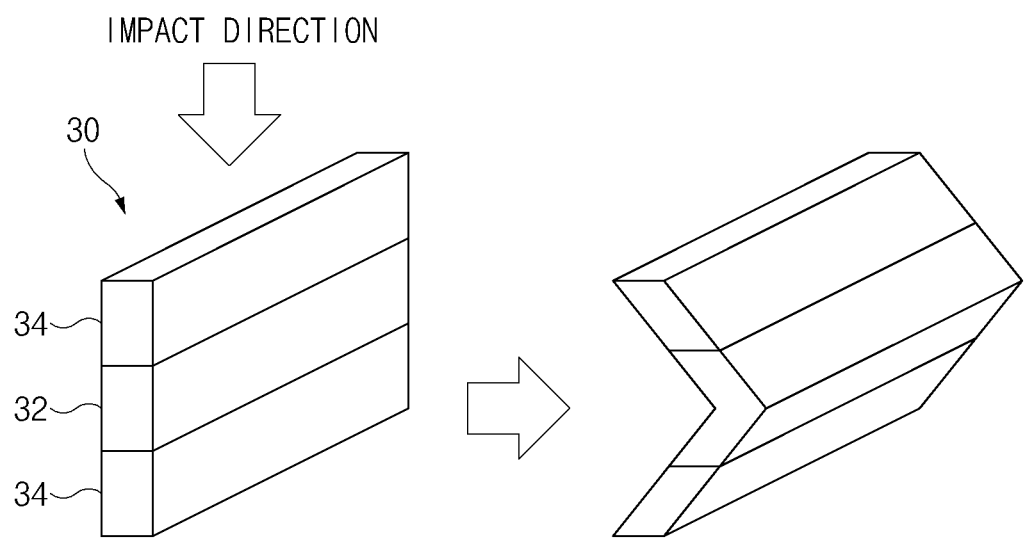
FIG. 5 is a perspective view illustrating configurations of the electrode tab before and after an impact is applied to the electrode tab of the electrode assembly according to an embodiment of the present invention.

FIG. 5 is a perspective view illustrating configurations of the electrode tab before and after an impact is applied to the electrode tab of the electrode assembly according to an embodiment of the present invention.

As illustrated in FIG. 5, even though an external impact is applied to the electrode assembly 20 according to an embodiment of the prevention to deform, e.g., fold the electrode tab 30, the short circuit may not occur by the non-conductive part or the ductile part 34 disposed on the upper and lower sides (or the left and right sides) of the conductive part 32 as described above to improve stability of the secondary battery or the electrode assembly against the external impact.

According to the present invention, the secondary battery may be prevented from being short-circuited due to the damage of the separator or the electrode of the electrode assembly by the electrode tab when the external impact is applied to the secondary battery or the electrode assembly.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode assembly manufactured by alternately stacking an electrode and a separator, the electrode assembly comprising:
at least one electrode tab extending outwardly from the electrode assembly along a longitudinal direction,
wherein the electrode tab comprises:
a conductive part exposed along a first length of the electrode tab in the longitudinal direction; and
a non-conductive part, the non-conductive part surrounding the conductive part on at least two sides oriented along the longitudinal direction, and the non-conductive part extending a second length along the longitudinal direction of the electrode tab alongside the first length, the second length being at least as long as the first length.

2. The electrode assembly of claim 1, wherein the non-conductive part is disposed on an upper side or a lower side of the conductive part.

3. The electrode assembly of claim 1, wherein the non-conductive part is disposed on left and right sides of the conductive part.

4. The electrode assembly of claim 1, wherein the electrode tab has a plate shape defined by a relatively large planar portion bounded by relatively thin outer edges, and
the conductive part is surrounded by the non-conductive part along the outer edges while the conductive part is exposed along the planar portion.

5. The electrode assembly of claim 1, wherein the non-conductive part comprises a polymer material.

6. The electrode assembly of claim 1, wherein the electrode tab is a positive electrode tab.

7. The electrode assembly of claim 6, wherein the conductive part comprises aluminum.

8. An electrode assembly manufactured by alternately stacking an electrode and a separator, the electrode assembly comprising:
at least one electrode tab extending outwardly from the electrode assembly along a longitudinal direction,
wherein the electrode tab comprises:
a conductive part exposed along a first length of the electrode tab in the longitudinal direction; and
a ductile part,
wherein the ductile part has ductility greater than that of the conductive part, the ductile part surrounding the conductive part on at least two sides oriented along the longitudinal direction, and the ductile part extending a second length along the longitudinal direction of the electrode tab alongside the first length, the second length being at least as long as the first length.

9. The electrode assembly of claim 8, wherein the ductile part is disposed on an upper side or a lower side of the conductive part.

10. The electrode assembly of claim 8, wherein the ductile part is disposed on left and right sides of the conductive part.

11. The electrode assembly of claim 8, wherein the electrode tab has a plate shape defined by a relatively large planar portion bounded by relatively thin outer edges, and
the conductive part is surrounded by the ductile part along the outer edges while the conductive part is exposed along the planar portion.

12. The electrode assembly of claim 8, wherein the ductile part comprises a polymer material.

13. The electrode assembly of claim 8, wherein the electrode tab is a positive electrode tab.

14. The electrode assembly of claim 13, wherein the conductive part comprises aluminum.

* * * * *